A. P. CRISWELL.
INDICATING GAGE.
APPLICATION FILED AUG. 28, 1911

1,097,393.

Patented May 19, 1914.

Witnesses:
Robert H. Weir
A. H. Rabeau

Inventor
Alexander P. Criswell,
by Jones Bain May
Attys

UNITED STATES PATENT OFFICE.

ALEXANDER P. CRISWELL, OF CHICAGO, ILLINOIS.

INDICATING-GAGE.

1,097,393. Specification of Letters Patent. Patented May 19, 1914.

Application filed August 28, 1911. Serial No. 646,490.

*To all whom it may concern:*

Be it known that I, ALEXANDER P. CRISWELL, a citizen of the United States, residing at Chicago, in the county of Cook and State of Illinois, have invented certain new and useful Improvements in Indicating-Gages, of which the following is a specification.

My invention relates to improvements in gages by means of which the contents of a substantially rectangular receptacle, or of a solid body, may be readily accertained.

One of the objects of my invention is to provided a gage whereby three dimensions of a rectangular body may be at once indicated by the application of the gage, and the cubic dimensions of the body determined.

Another object of my invention is to provide a socket for such a gage to be placed within the receptacle to receive and hold suitably constructed and marked gage arms in relative positions whereby the dimensions above mentioned may be indicated.

Other and further objects of my invention will be readily understood by persons skilled in the art from a consideration of the specification, in which the novel features by which my invention is characterized, are pointed out, taken in conjunction with the drawings, wherein—

Figure 1:
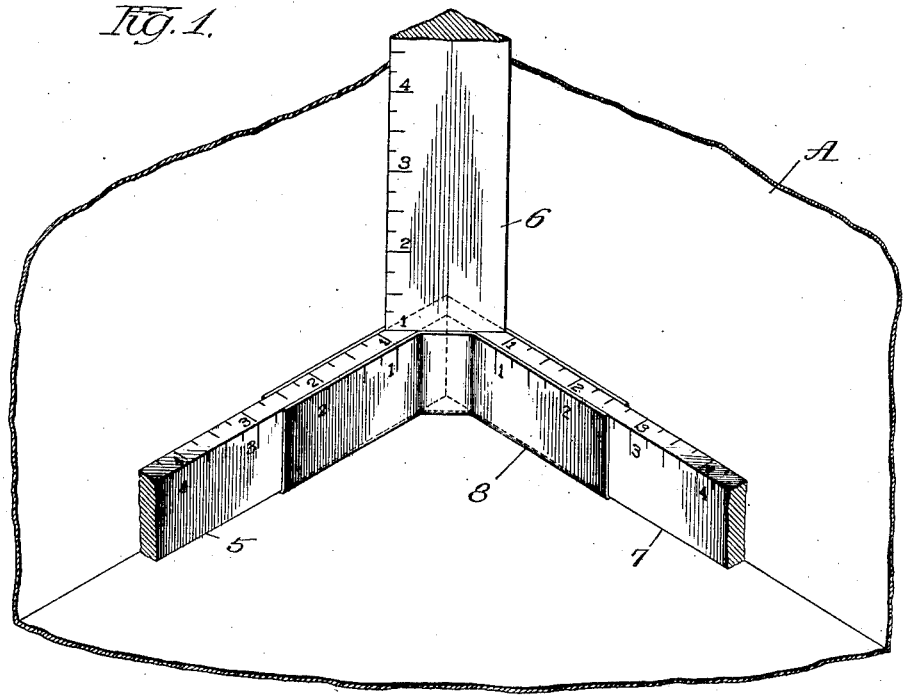
Figure 2:
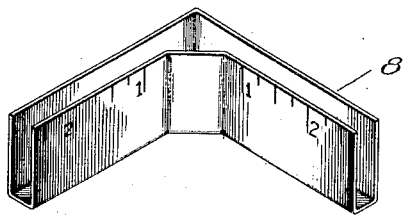

Figure 1 shows a portion of a rectangular receptacle with my gage located in one corner thereof; and Fig. 2 is a perspective view of the gage socket.

In both views, the same reference characters indicate similar parts.

My gage is especially desirable for use in measuring the cubical contents of blocks of ice, whereby the length, breadth, and depth of such an object may be readily read in inches from the progressive numerical indications placed upon the three rectangular arms, constituting my gage, from which results, the cubic contents of the block are at once determined; and this quotient divided by the constant 30 will give a very close approximation of the weight of such block of ice in terms of pounds and fractions thereof. The gage may also be used for determining the dimensions of a fluid or other content of a box or receptacle. It is shown placed in one corner of a box A, in Fig. 1.

The gage is made of three arms 5, 6, and 7, placed in rectangular position relatively to each other, when associated for use, and may be permanently, or separably, connected. When they are adapted to be separated an angular socket 8, conveniently formed of sheet metal, may be used to temporarily hold the members in their respective positions, as by the friction of the respective parts. Arm 6 is provided with a tenon which enters the socket in front of the horizontal arms, as shown in Fig. 1.

Each of the members is calibrated progressively in lineal measurement, as in divisions of inches and fractions thereof from the point of juncture to the ends, so that measurement is made from a common point in three directions.

When the gage is placed in a rectangular box, or other like receptacle, the length, width, and height thereof, or of any body or thing within the box, may be directly read from the graduated scale on each arm. Thus, when the box is fully or partially filled with a liquid, the interior length, and width, of the box, and the depth of the liquid, may be readily ascertained. It is, of course, obvious that each arm may be made so that it may be longitudinally extended and contracted, as usual with rules, or gages, of this general character, so that the interior measurements of the receptacle may be conveniently and accurately made.

While I have herein described a single embodiment of my invention, it is evident that changes may be made therein within the scope of the appended claims.

What I claim is:

1. In a device of the character described, a gage, or scale, comprising three, separable, graduated arms, and a socket for said arms adapted and arranged to hold said arms each at a right angle to the other two.

2. A device of the character described, comprising three separable arms and a socket for said arms, formed with two right angle extensions for holding two of the arms and a socket at the juncture of the extensions adapted to receive and hold the third arm at right angles to the other two arms.

In testimony whereof I hereunto set my hand in the presence of two witnesses.

ALEXANDER P. CRISWELL.

In the presence of—
MARY F. ALLEN,
W. LINN ALLEN.

Copies of this patent may be obtained for five cents each, by addressing the "Commissioner of Patents, Washington, D. C."